United States Patent
Hahakura et al.

(10) Patent No.: US 10,589,419 B2
(45) Date of Patent: Mar. 17, 2020

(54) ROBOT AND ROBOT SYSTEM

(71) Applicant: Seiko Epson Corporation, Tokyo (JP)

(72) Inventors: Seiji Hahakura, Azumino (JP); Shingo Hoshino, Hokuto (JP)

(73) Assignee: Seiko Epson Corporation (JP)

( * ) Notice: Subject to any disclaimer, the term of this patent is extended or adjusted under 35 U.S.C. 154(b) by 76 days.

(21) Appl. No.: 16/013,089

(22) Filed: Jun. 20, 2018

(65) Prior Publication Data

US 2018/0370022 A1    Dec. 27, 2018

(30) Foreign Application Priority Data

Jun. 21, 2017   (JP) ................. 2017-121159

(51) Int. Cl.
| | |
|---|---|
| B25J 9/00 | (2006.01) |
| B25J 19/00 | (2006.01) |
| B25J 18/00 | (2006.01) |
| B25J 17/02 | (2006.01) |
| B25J 9/16 | (2006.01) |

(52) U.S. Cl.
CPC ........... B25J 9/0009 (2013.01); B25J 9/1664 (2013.01); B25J 17/02 (2013.01); B25J 18/00 (2013.01); B25J 19/0029 (2013.01)

(58) Field of Classification Search
CPC ...... B25J 9/0009; B25J 19/0029; B25J 18/00; B25J 17/02; B25J 9/1664
USPC ....................................................... 700/245
See application file for complete search history.

(56) References Cited

U.S. PATENT DOCUMENTS

| | | | | |
|---|---|---|---|---|
| 5,375,480 A | * | 12/1994 | Nihei | B25J 19/0029 74/490.02 |
| 5,777,267 A | * | 7/1998 | Szydel | B25J 19/0025 174/72 A |
| 7,715,946 B2 | * | 5/2010 | Watanabe | B25J 19/023 219/121.85 |
| 9,227,327 B2 | * | 1/2016 | Nakahara | B25J 9/1697 |
| 2010/0043587 A1 | * | 2/2010 | Broberg | B25J 19/0016 74/490.01 |
| 2012/0111135 A1 | * | 5/2012 | Ichibangase | B25J 17/0283 74/490.06 |
| 2013/0098190 A1 | * | 4/2013 | Pan | B25J 19/0025 74/490.02 |
| 2013/0168505 A1 | * | 7/2013 | Ljungkvist | B25J 9/0009 248/56 |
| 2013/0260606 A1 | * | 10/2013 | Hahakura | H01R 13/60 439/534 |
| 2014/0103168 A1 | * | 4/2014 | Kume | B25J 19/0025 248/51 |
| 2014/0109712 A1 | * | 4/2014 | Ono | B25J 9/042 74/490.02 |

(Continued)

FOREIGN PATENT DOCUMENTS

JP   2016-078221 A   5/2016

*Primary Examiner* — Jaime Figueroa
(74) *Attorney, Agent, or Firm* — Harness, Dickey & Pierce, P.L.C.

(57) ABSTRACT

A robot includes a base, an arm provided on the base, an actuator that drives the arm, a connector to which at least a part of a first wire of another apparatus is connected, and a second wire that connects the actuator and the connector, and the base has a housing having an hole, to which the connector is fixed and a lid covering at least a part of the hole, through which the first wire is inserted.

18 Claims, 9 Drawing Sheets

(56) References Cited

U.S. PATENT DOCUMENTS

| | | | | |
|---|---|---|---|---|
| 2014/0290415 A1* | 10/2014 | Hasuo | ............... | B25J 19/0025 |
| | | | | 74/490.02 |
| 2015/0007681 A1* | 1/2015 | Murakami | ........... | B25J 19/0025 |
| | | | | 74/490.02 |
| 2015/0034698 A1* | 2/2015 | Takahashi | ............. | B23K 37/02 |
| | | | | 228/33 |
| 2015/0039125 A1* | 2/2015 | Takahashi | ............ | B25J 19/0025 |
| | | | | 700/245 |
| 2016/0114491 A1* | 4/2016 | Lee | ..................... | B25J 19/0029 |
| | | | | 74/490.06 |
| 2017/0291313 A1* | 10/2017 | Inoue | ................... | B25J 19/0029 |
| 2018/0093376 A1* | 4/2018 | Teranaka | ................. | B25J 9/044 |
| 2018/0319022 A1* | 11/2018 | Yoshimura | .............. | B25J 9/047 |
| 2018/0333844 A1* | 11/2018 | Inoue | ......................... | B25J 9/08 |

* cited by examiner

ROBOT AND ROBOT SYSTEM

BACKGROUND

1. Technical Field

The present invention relates to a robot and robot system.

2. Related Art

Research and development of technologies on respective robots and robot control apparatuses that control robots are carried out.

In this regard, a horizontal articulated robot connected to a separate robot control apparatus by a wire (wired connection) and controlled by the robot control apparatus is known (see Patent Document 1 (JP-A-2016-78221)).

In the horizontal articulated robot, a connecting portion (e.g. connector) to which the wire connecting between the horizontal articulated robot and the robot control apparatus is provided outside of the base of the horizontal articulated robot. In the connecting portion provided outside of the base, a defect of deformation by application of an unintended impact or the like may be caused. On the other hand, when the connecting portion is provided inside of the base of the horizontal articulated robot, the connecting portion floats in the air inside of the base, and a defect of breaking of the wire connected to the connecting portion may be caused.

SUMMARY

An aspect of the invention is directed to a robot including a base, a movable unit provided on the base, a drive unit that drives the movable unit, a connecting portion to which at least a part of a first wire of another apparatus is connected, and a second wire that connects the drive unit and the connecting portion, wherein the base has a housing part having an opening portion, to which the connecting portion is fixed, and a lid part covering at least a part of the opening portion, through which the first wire is inserted.

According to this configuration, the robot includes the base, the movable unit provided on the base, the drive unit that drives the movable unit, the connecting portion to which at least a part of the first wire of another apparatus is connected, and the second wire that connects the drive unit and the connecting portion, wherein the base has the housing part having the opening portion, to which the connecting portion is fixed, and the lid part covering at least a part of the opening portion, through which the first wire is inserted. Thereby, the robot may suppress a defect in at least one of the connecting portion and the second wire.

In another aspect of the invention, the robot may be configured such that the lid part has a cutout portion with which the lid part can be detached from the housing part in a state in which a fastening member for fastening the lid part and the housing part is loosened.

According to this configuration, in the robot, the lid part has the cutout portion with which the lid part can be detached from the housing part in the state in which the fastening member for fastening the lid part and the housing part is loosened. Thereby, the robot may shorten the time required for work of attaching the lid part from the housing part.

In another aspect of the invention, the robot may be configured such that a first sealing member is provided between the first wire and the lid part.

According to this configuration, the robot has the first sealing member between the first wire and the lid part. Thereby, the robot may suppress entry of foreign matter from between the first wire and the lid part.

In another aspect of the invention, the robot may be configured such that the other apparatus is a robot control apparatus that controls the robot.

According to this configuration, in the robot, the other apparatus is the robot control apparatus that controls the robot. Thereby, the robot may suppress a defect in at least one of the connecting portion and the second wire to which at least a part of the first wire of the robot control apparatus is connected through the connecting portion.

In another aspect of the invention, the robot may be configured such that the first wire includes a power line for supplying electric power from the robot control apparatus to the drive unit and a signal line for transmitting signals between the robot control apparatus and the drive unit.

According to this configuration, in the robot, the first wire includes the power line for supplying electric power from the robot control apparatus to the drive unit and the signal line for transmitting signals between the robot control apparatus and the drive unit. Thereby, the robot may suppress a defect in at least one of the connecting portion and the second wire to which at least a part of the first wire including the power line and the signal line is connected.

In another aspect of the invention, the robot may be configured such that the connecting portion has a first connecting portion to which the power line is connected and a second connecting portion to which the signal line is connected.

According to this configuration, in the robot, the connecting portion has the first connecting portion to which the power line is connected and a second connecting portion to which the signal line is connected. Thereby, the robot may suppress a defect in a part or all of the connecting portion having the first connecting portion and the second connecting portion and the second wire.

Another aspect of the invention is directed to a robot system including the above described robot and a robot control apparatus that controls the robot.

According to this configuration, in the robot system, the robot includes the base, the movable unit provided on the base, the drive unit that drives the movable unit, the connecting portion to which at least a part of the first wire of another apparatus is connected, and the second wire that connects the drive unit and the connecting portion, wherein the base has the housing part having the opening portion, to which the connecting portion is fixed, and the lid part covering at least a part of the opening portion, through which the first wire is inserted. Thereby, the robot system may suppress a defect in at least one of the connecting portion and the second wire.

As descried above, the robot includes the base, the movable unit provided on the base, the drive unit that drives the movable unit, the connecting portion to which at least a part of the first wire of another apparatus is connected, and the second wire that connects the drive unit and the connecting portion, wherein the base has the housing part having the opening portion, to which the connecting portion is fixed, and the lid part covering at least a part of the opening portion, through which the first wire is inserted. Thereby, the robot may suppress a defect in at least one of the connecting portion and the second wire.

Further, in the robot system, the robot includes the base, the movable unit provided on the base, the drive unit that drives the movable unit, the connecting portion to which at least a part of the first wire of another apparatus is connected, and the second wire that connects the drive unit and the connecting portion, wherein the base has the housing part having the opening portion, to which the connecting portion is fixed, and the lid part covering at least a part of the opening portion, through which the first wire is inserted. Thereby, the robot system may suppress a defect in at least one of the connecting portion and the second wire.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

As below, an embodiment of the invention will be explained with reference to the drawings.

Outline of Robot

Figure 1:
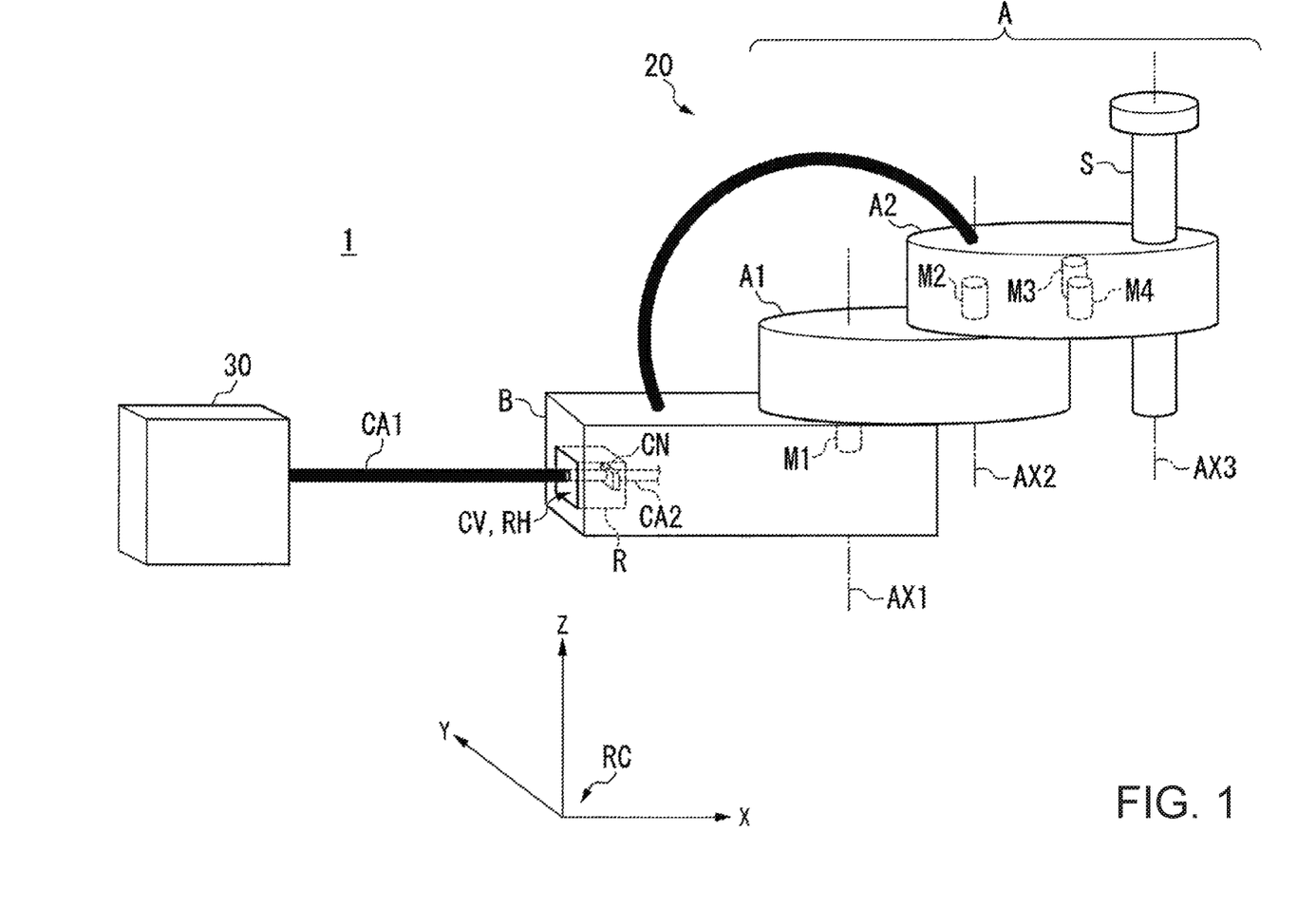
FIG. 1 shows an example of a configuration of a robot system 1 according to an embodiment.

FIG. 1 shows an example of a configuration of a robot system 1 according to an embodiment.

First, the outline of a robot 20 of a robot system 1 according to the embodiment will be explained.

Here, in a robot X (e.g. a robot of related art) different from the robot 20, a connecting portion (e.g. connector) to which a wire connecting the robot X and a robot control apparatus 30 may be provided outside of the base of the robot X. In this case, in the connecting portion provided outside of the base, a defect of deformation by application of an unintended impact or the like may be caused. Further, in this case, a liquid such as water may enter between the connecting portion and the wire, and the connecting portion and the wire are waterproofed and monetary cost of the manufacture of the robot X may increase. On the other hand, when the connecting portion is provided inside of the base, the connecting portion floats in the air inside of the base, and a defect of breaking of the wire connected to the connecting portion may occur.

Accordingly, the robot 20 includes a base, a movable unit provided on the base, a drive unit that drives the movable unit, a connecting portion to which at least a part of a first wire of another apparatus is connected, and a second wire that connects the drive unit and the connecting portion, and the base has a housing part having an opening portion, to which the connecting portion is fixed and a lid part covering at least a part of the opening portion, through which the first wire is inserted. Thereby, the robot 20 may suppress a defect in at least one of the connecting portion and the second wire. Further, the robot 20 may suppress entry of a liquid such as water between the connecting portion and the first wire. As a result, the inexpensive connecting portion and the inexpensive first wire may be used and the increase in the monetary cost of the manufacture of the robot 20 may be suppressed. As below, a specific example of the configuration of the robot system 1 including the configuration of the robot 20 will be explained in detail. Further, as below, as an example, the case where the other apparatus is the robot control apparatus 30 will be explained.

Configuration of Robot System

As below, the configuration of the robot system 1 will be explained.

As shown in FIG. 1, the robot system 1 includes the robot 20 and the robot control apparatus 30.

The robot 20 is a horizontal articulated robot (scalar robot). Note that the robot 20 may be another robot such as a Cartesian coordinate robot or vertical articulated robot (e.g. single-arm robot, dual-arm robot, or the like) in place of the horizontal articulated robot. The Cartesian coordinate robot is e.g. a gantry robot.

In the example shown in FIG. 1, the robot 20 is installed on an installation surface as a predetermined surface. The installation surface is e.g. a floor surface of a room in which the robot 20 is installed. Note that the installation surface may be another surface such as a wall surface or ceiling surface within the room, a table, a jig, an upper surface of a bench, an outdoor floor surface or wall surface in place of the floor surface. Hereinafter, for convenience of explanation, a direction orthogonal to the installation surface from the center of gravity of the robot 20 toward the installation surface is referred to as "lower" or "downward direction" and a direction opposite to the direction is referred to as upper or upward direction. Further, as below, as an example, the case where the downward direction coincides with both a negative direction of a Z-axis in a robot coordinate system RC as a robot coordinate system of the robot 20 and the direction of gravity will be explained. Note that the downward direction may not necessarily coincide with one or both of the negative direction and the gravity direction instead.

The robot 20 includes a base B installed (fixed) unmovably on the installation surface and a movable unit A. The movable unit A includes a first arm A1 rotatably supported by the base B about a first axis AX1, a second arm A2 rotatably supported by the first arm A1 about a second axis AX2, and a shaft S rotatably supported about a third axis AX3 and translationally supported in the axis direction of the third axis AX3 by the second arm A2.

The shaft S is an axial member having a cylindrical shape. A ball screw groove and a spline groove (not shown) are respectively formed in the circumference surface of the shaft S. The shaft S is provided to penetrate an opposite end portion to the first arm A1 of the end portions of the second arm A2 in the upward and downward directions. Further, in the shaft S, in the example, a flange in a circular disc shape having a larger radius than the radius of the cylinder is provided in the upper end portion of the end portions of the shaft S. The center axis of the cylinder coincides with the center axis of the flange. It may be possible or impossible to attach an end effector to the distal end as the end portion of the shaft S in which the flange is not provided. Further, the cylinder and the flange may be integrally or separately formed.

In the example shown in FIG. 1, the shape of the base B is a rectangular parallelepiped shape. Hereinafter, for convenience of explanation, the surface in contact with the installation surface of the six surfaces of the base B is referred to as the lower surface of base B. Further, in the example, the direction along the longitudinal direction of the base B of the directions parallel to the installation surface coincides with the direction along an X-axis in the robot coordinate system RC. Furthermore, in the example, the direction along the lateral direction of the base B of the directions parallel to the installation surface coincides with the direction along a Y-axis in the robot coordinate system RC. Here, the positive direction of the Z-axis in the robot coordinate system RC coincides with a direction of a vector obtained by an outer product of a vector toward the positive direction of the X-axis and a vector toward the positive direction of the Y-axis. Note that the direction along the X-axis does not necessarily coincide with the direction along the longitudinal direction (that is, the direction along the Y-axis does not necessarily coincide with the direction along the lateral direction). Hereinafter, for convenience of explanation, the surface orthogonal to the lower surface of the base B of the six surfaces of the base B on the negative direction side of the X-axis in the robot coordinate system RC is referred to as "back surface" of the base B.

Further, the base B has a housing part R. In the example shown in FIG. 1, the housing part R is provided on the back surface of the base B so that the whole housing part R may be located (contained) inside of the base B. Note that the housing part R may be provided on another surface than the back surface of the six surfaces of the base B so that the whole housing part R may be located inside of the base B.

The housing part R is a member that can fix a connecting portion CN, which will be described later, inside of the housing part R, in e.g. a container shape. However, the part may have a frame shape instead or any shape as long as the member can fix a connecting portion CN inside of the housing part R. In the example shown in FIG. 1, the housing part R is a container having a rectangular parallelepiped shape. In the example, one surface of the six surfaces of the housing part R is formed by the back surface of the base B. Note that a part or all of the six surfaces of the housing part R may be formed by at least a part of one or more surfaces of the base B or not formed by at least one or more surfaces of the base B. A part or entire of the housing part R may not be contained inside of the base B. In this case, at least a part of the housing part R is provided outside of the base B. In the case, for example, at least a part of the housing part R is provided in the back surface of the base B to be located outside of the base B.

An opening portion RH as a hole connecting outside and inside of the housing part R is formed in the back surface of the base B (i.e., the surface on the negative direction side of the X-axis in the robot coordinate system RC of the surfaces of the housing part R). The shape of the opening portion RH when the base B is seen toward the positive direction of the X-axis in the robot coordinate system RC is nearly a rectangular shape with the respective triangles on the four corners cut off in the rectangular shape. Note that the shape of the opening portion RH in the case may be another shape such as a circular shape.

Further, the housing part R is the container to which the connecting portion CN is fixed.

The connecting portion CN has a first part CN1 (not shown in FIG. 1) as a part to which a first wire CA1 is connected and a second part CN2 (not shown in FIG. 1) as a part to which a second wire CA2 (not shown in FIG. 1) is connected.

The first wire CA1 is a wire connecting between the robot control apparatus 30 and the robot 20. The first wire CA1 includes a power line for supplying electric power from the robot control apparatus 30 to a drive unit (i.e., an actuator, which will be described later) of the robot 20, and a signal line for transmitting signals between the robot control apparatus 30 and the drive unit. Note that the first wire CA1 may include another wire in addition to the power line and the signal line.

The second wire CA2 is a wire connecting the drive unit of the robot 20 and the connecting portion CN.

The first wire CA1 is connected to the first part CN1 (not shown in FIG. 1, see FIG. 3, for example) of the connecting portion CN and the second wire CA2 is connected to the second part CN2 (not shown in FIG. 1, see FIG. 3, for example) of the connecting portion CN, and thereby, the first wire CA1 is connected to the drive unit via the connecting portion CN and the second wire CA2. That is, the robot control apparatus 30 is connected to the drive unit via the first wire CA1, the connecting portion CN, and the second wire CA2.

Note that the connecting portion CN may be another connecting member in place of the connector. Or, the connecting portion CN may be a connector to which a part of the first wire CA1 (e.g. one of the above described power line and signal line, a part of the power line, a part of the signal line, or the like) is connected. Or, the connecting portion CN may be a connector to which a part of the second wire CA2 (a wire corresponding to the first wire CA1) is connected.

The surface to which the connecting portion CN of the surfaces of the housing part R is fixed is the surface on the positive direction side of the X-axis in the robot coordinate system RC of the surfaces of the housing part R. Note that the surface to which the connecting portion CN is fixed of the surfaces of the housing part R may be another surface of the housing part R in place of the surface on the positive direction side.

Further, the base B has a lid part CV through which the first wire CA1 is inserted. The lid part CV covers at least a part of the opening portion RH. As below, as an example, the case where the lid part CV has a plate-like member that covers the whole opening portion RH, in which an insertion hole CH (not shown in FIG. 1, see FIG. 4, for example) through which the first wire CA1 is inserted will be explained. Note that the lid part CV may be a member having another shape in place of the plate-like member with the insertion hole CH formed therein. The lid part CV is fastened (fixed) to the housing part R by one or more fastening members SC (not shown in FIG. 1, see FIG. 4, for example). As below, as an example, the case where the lid part CV is fastened (fixed) to the housing part R by four fastening members SC will be explained. The fastening members SC are e.g. screws that can be fastened or loosened by a user with a hand. Note that the fastening members SC may be other fastening members that can fix the lid part CV to the housing part R by fastening such as screws that can be fastened or loosened by a user using a tool such as a driver instead.

Here, referring to FIGS. 2 to 7, the housing part R and the lid part CV are explained. Note that, in FIGS. 2 to 7, the first wire CA1, the movable unit A, a part of the second wire CA2 are respectively omitted to avoid complication of the drawings.

Figure 2:
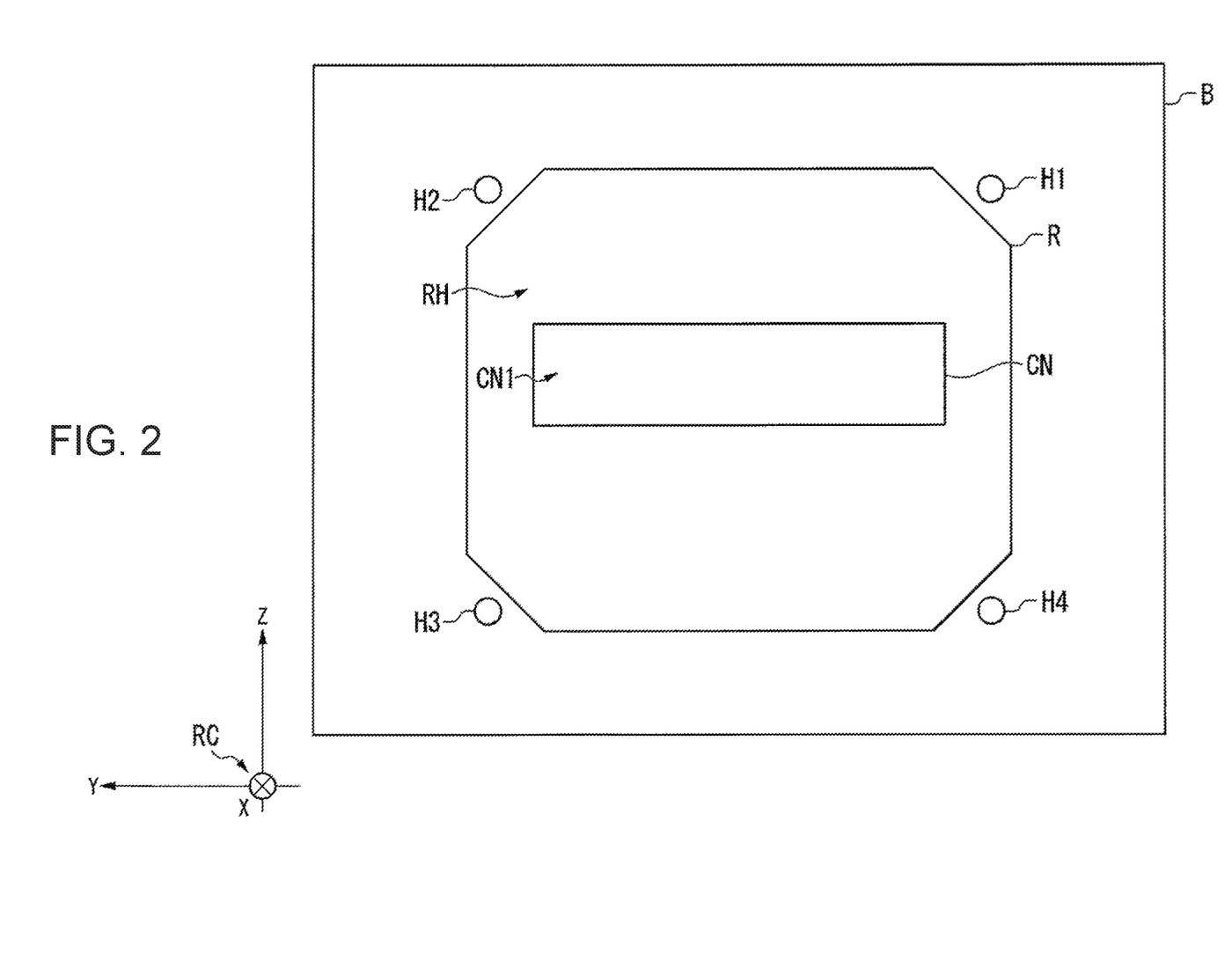
FIG. 2 shows an example of a base B in a state in which a lid part CV is detached from a housing part R as seen toward a positive direction of an X-axis in a robot coordinate system RC.

FIG. 2 shows an example of the base B in a state in which the lid part CV is detached from the housing part R as seen toward the positive direction of the X-axis in the robot coordinate system RC.

In the example shown in FIG. 2, the shape of the opening portion RH formed in the back surface of the base B (i.e., the opening portion RH formed in the housing part R) is nearly the rectangular shape as described above with the respective triangles on the four corners cut off in the rectangular shape. Screw holes are formed in the respective surfaces corresponding to the four corners of the back surface. In the example, the screw holes are threaded and the fastening members SC as the screws in the example are fastened thereto. The screw hole H1 shown in FIG. 2 is an example of the screw hole formed in the corner on the fourth quadrant side within the YZ-plane in the robot coordinate system RC of the four corners. The screw hole H2 shown in FIG. 2 is an example of the screw hole formed in the corner on the first quadrant side within the YZ-plane of the four corners. The screw hole H3 shown in FIG. 2 is an example of the screw hole formed in the corner on the second quadrant side within the YZ-plane of the four corners. The screw hole H4 shown in FIG. 2 is an example of the screw hole formed in the corner on the third quadrant side within the YZ-plane of the four corners.

Further, in the example shown in FIG. 2, the lid part CV is not attached to the housing part R, and it may be confirmed that the first part CN1 of the connecting portion CN fixed to the housing part R is located inside of the housing part R through the opening portion RH.

Figure 3:
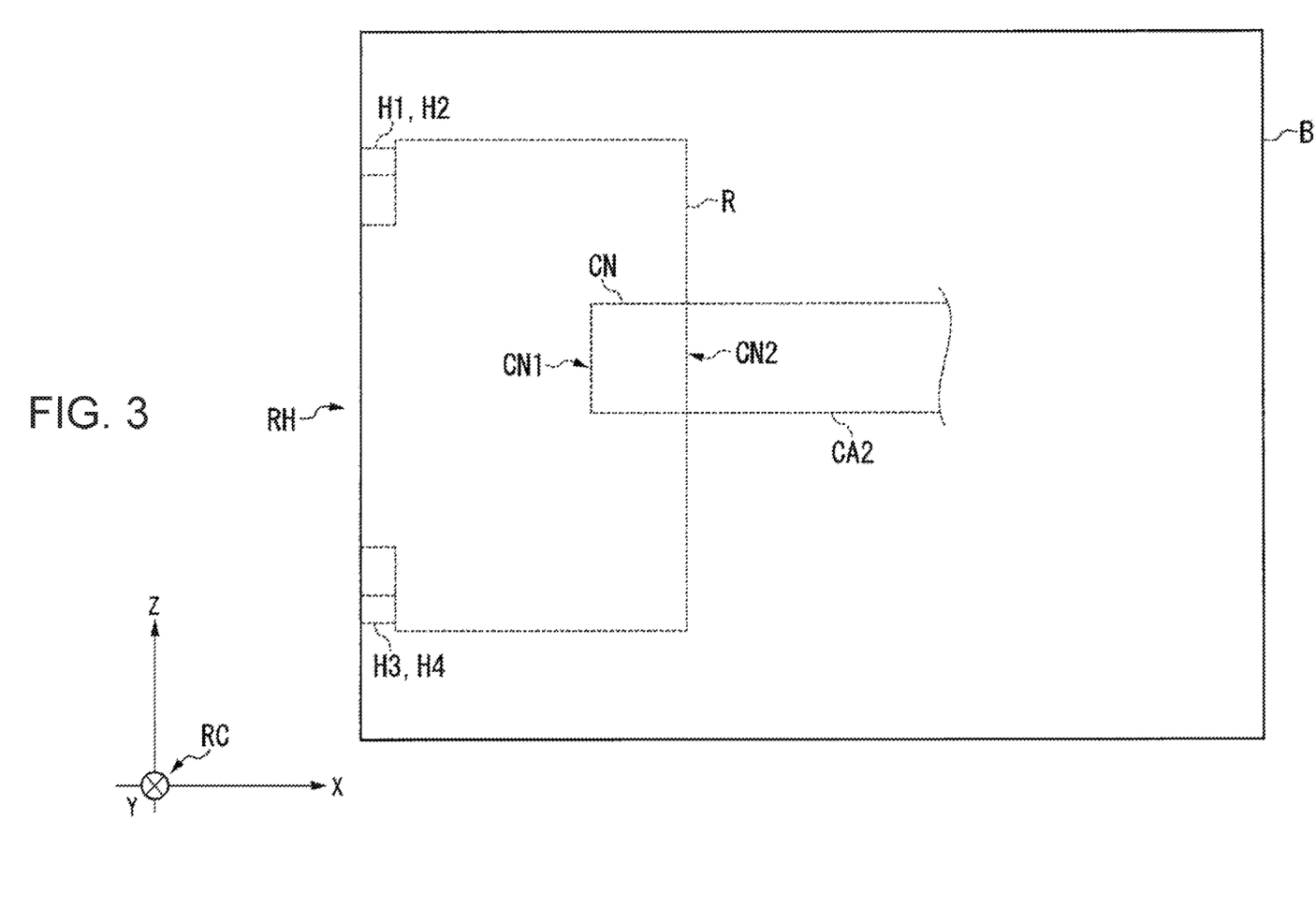
FIG. 3 shows an example of the base B in the state in which the lid part CV is detached from the housing part R as seen toward a positive direction of a Y-axis in the robot coordinate system RC.

FIG. 3 shows an example of the base B in the state in which the lid part CV is detached from the housing part R as seen toward positive direction of the Y-axis in the robot coordinate system RC. In the example shown in FIG. 3, the connecting portion CN is fixed to the housing part R so that the first part CN1 may be placed inside of the housing part R and the second part CN2 may be placed outside of the housing part R. Note that the connecting portion CN may be fixed to the housing part R so that both the first part CN1 and the second part CN2 may be placed inside of the housing part R, or the connecting portion CN may be fixed so that both may be placed outside of the housing part R.

Figure 4:
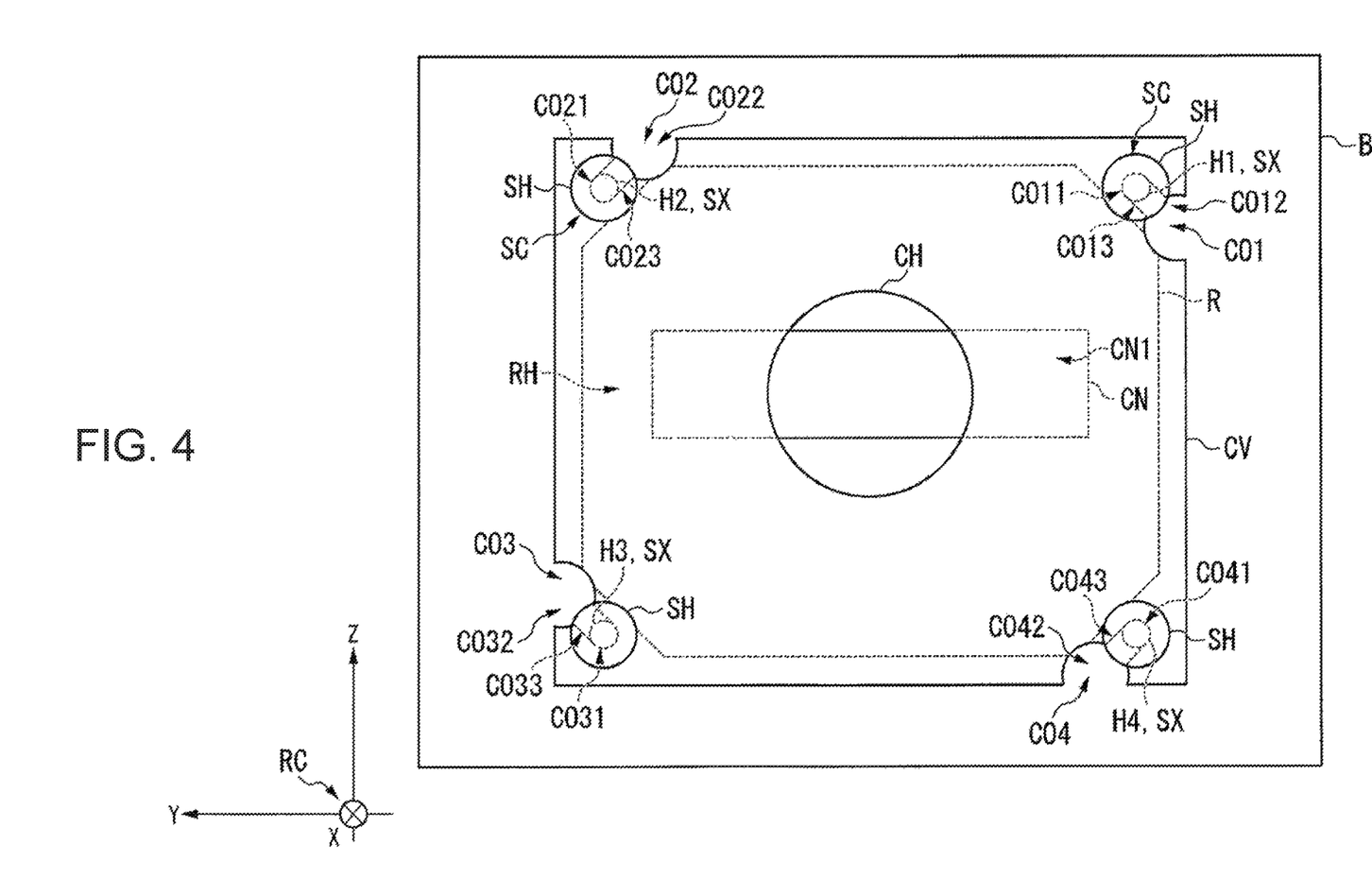
FIG. 4 shows an example of the base B in a state in which the lid part CV is fastened to the housing part R by fastening members SC as seen toward the positive direction of the X-axis in the robot coordinate system RC.

FIG. 4 shows an example of the base B in a state in which the lid part CV is fastened to the housing part R by the fastening members SC as seen toward the positive direction of the X-axis in the robot coordinate system RC. Hereinafter, for convenience of explanation, the relative position relationship between the lid part CV and the housing part R in the state is referred to as "first position relationship". That is, FIG. 4 shows the respective lid part CV and housing part R when the relative position relationship between the lid part CV and the housing part R coincides with the first position relationship.

In the example shown in FIG. 4, the lid part CV is fastened to the housing part R by the fastening members SC fastened to the screw holes H1 to H4 as described above. That is, the lid part CV and the housing part R are fastened (fixed) by the fastening members SC. More specifically, the relative position relationship between the lid part CV and the housing part R is fastened (fixed) by the fastening members SC.

Here, the lid part CV has cutout portions with which the lid part CV can be detached from the housing part R in the state in which the fastening members SC for fastening the relative position relationship between the lid part CV and the housing part R are loosened. The cutout portion CO1 shown in FIG. 4 is an example of the cutout portion corresponding to the above described screw hole H1 of the cutout portions with which the lid part CV can be detached from the housing part R. The cutout portion CO2 shown in FIG. 4 is an example of the cutout portion corresponding to the above described screw hole H2 of the cutout portions with which the lid part CV can be detached from the housing part R. The cutout portion CO3 shown in FIG. 4 is an example of the cutout portion corresponding to the above described screw hole H3 of the cutout portions with which the lid part CV can be detached from the housing part R. The cutout portion CO4 shown in FIG. 4 is an example of the cutout portion corresponding to the above described screw hole H4 of the cutout portions with which the lid part CV can be detached from the housing part R.

The cutout portion CO1 has a first hole CO11, a second hole CO12, and a third hole CO13. That is, the cutout portion CO1 is formed in the lid part CV to have a structure of a combination of the first hole CO11, the second hole CO12, and the third hole CO13.

The cutout portion CO2 has a first hole CO21, a second hole CO22, and a third hole CO23. That is, the cutout portion CO2 is formed in the lid part CV to have a structure of a combination of the first hole CO21, the second hole CO22, and the third hole CO23.

The cutout portion CO3 has a first hole CO31, a second hole CO32, and a third hole CO33. That is, the cutout portion CO3 is formed in the lid part CV to have a structure of a combination of the first hole CO31, the second hole CO32, and the third hole CO33.

The cutout portion CO4 has a first hole CO41, a second hole CO42, and a third hole CO43. That is, the cutout portion CO4 is formed in the lid part CV to have a structure of a combination of the first hole CO41, the second hole CO42, and the third hole CO43.

The respective structures of the cutout portions CO1 to CO4 are the same as one another. That is, the respective structures of the first holes CO11 to CO41 are the same as one another. The respective structures of the second holes CO12 to CO42 are the same as one another. The respective structures of the third holes CO13 to CO43 are the same as one another. Accordingly, as below, the cutout portion CO1 will be explained and the explanation of the respective cutout portions CO2 to CO4 will be omitted.

The first hole CO11 is a hole having the same radius as the radius of the screw hole H1. Further, the first hole CO11 is a hole overlapping (coinciding) with the screw hole H1 when the base B is seen toward the positive direction of the X-axis in the robot coordinate system RC and the relative position relationship between the lid part CV and the housing part R coincides with the first position relationship.

The second hole CO12 is a hole having a radius larger than the radius of a screw head SH of the fastening member SC. The screw head SH is a part grasped when the user turns the fastening member SC with a hand as described above. Further, the center of the second hole CO12 is a hole that coincides with the center of the screw hole H1 when the base B is seen toward the positive direction and the relative position relationship between the lid part CV and the housing part R coincides with a second position relationship. That is, in this case, the second hole CO12 and the screw hole H1 are concentric. The second position relationship refers to a relative position relationship between the lid part CV and the housing part R when the lid part CV is detached from the housing part R. In the example, the second position relationship refers to a relative position relationship between the lid part CV and the housing part R when the lid part CV is rotated by a predetermined angle about a predetermined axis from the state in which the relative position relationship between the lid part CV and the housing part R coincides with the first position relationship. The predetermined axis is e.g. an axis passing through the center of the lid part CV orthogonally to the lid part CV when the back surface is seen toward the positive direction. Note that the predetermined axis may be another axis according to the lid part CV instead. The predetermined angle is e.g. 10°. Note that the predetermined angle may be an angle smaller than 10° or larger than 10°. The rotation about the predetermined axis may be clockwise rotation or counterclockwise rotation.

Figure 5:
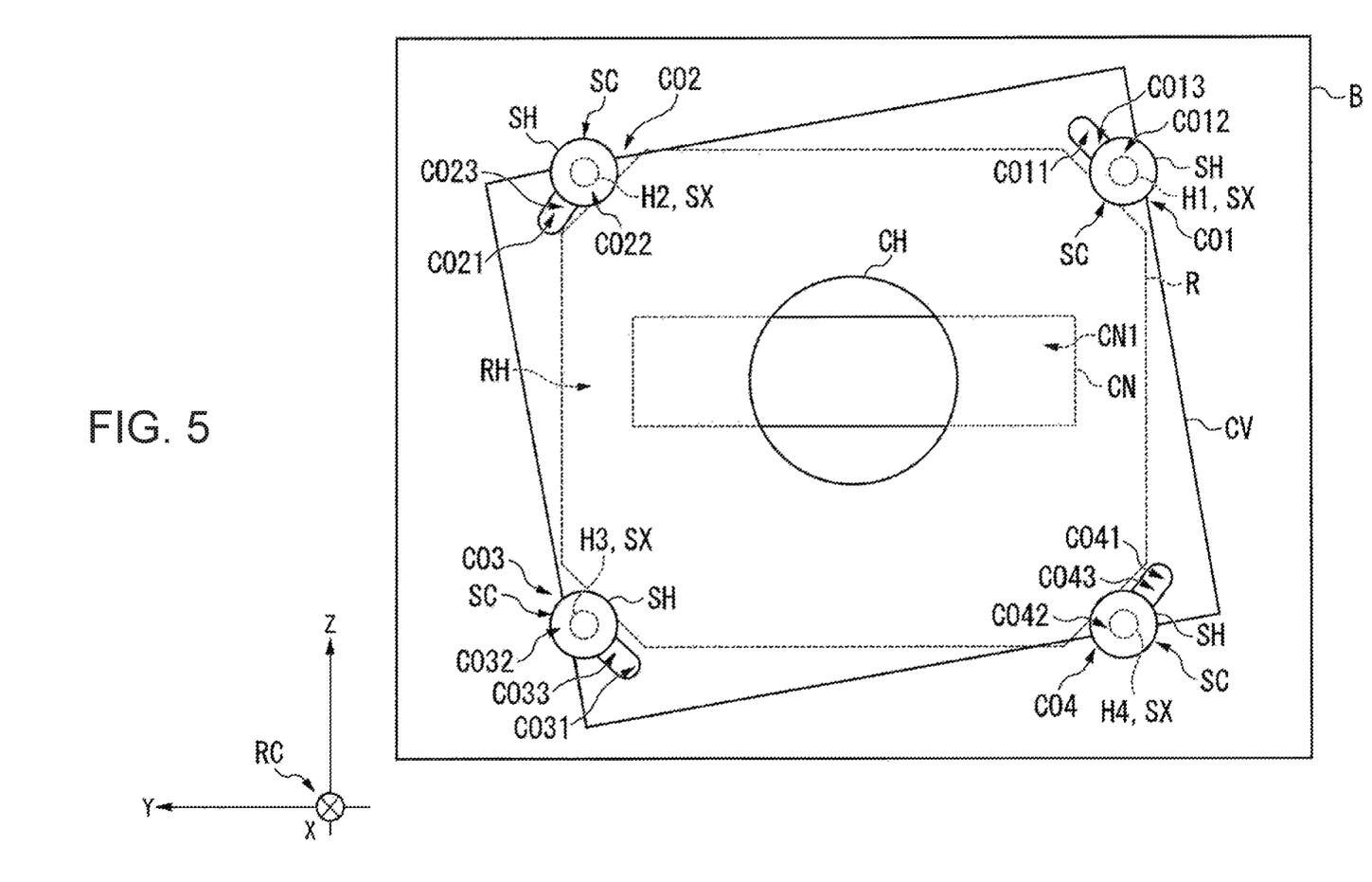
FIG. 5 shows an example of a relative position relationship between the lid part CV and the housing part R when the lid part CV shown in FIG. 4 is rotated by a predetermined angle about a predetermined axis.

FIG. 5 shows an example of the relative position relationship between the lid part CV and the housing part R when the lid part CV shown in FIG. 4 is rotated by the predetermined angle about the predetermined axis. As shown in FIG. 5, in this case, the relative position relationship between the lid part CV and the housing part R coincides with the second position relationship, and thus, the second hole CO12 and the screw hole H1 are concentric. Further, in the case, the radius of the second hole CO12 is larger than the radius of the screw head SH and the user moves the lid part CV in the negative direction of the X-axis in the robot coordinate system RC, and thereby, in the state in which the fastening members SC are loosened, but the fastening members SC are not detached from the housing part R, the lid part CV may be detached from the housing part R. As a result, the robot 20 may shorten the time required for work of detaching the lid part CV from the housing part R.

Note that FIG. 4 is only a conceptual diagram. Accordingly, when the lid part CV shown in FIG. 4 is rotated by the predetermined angle about the predetermined axis, the center of the screw hole H1 and the center of the second hole CO12 appear not to coincide.

Returning to FIG. 4, the third hole CO13 is a hole connecting the first hole CO11 and the second hole CO12. Further, the third hole CO13 is a hole (groove) for an axis portion SX of the fastening member SC to pass from the first hole CO11 to the second hole CO12 when the lid part CV is rotated by the predetermined angle about the predetermined axis and the relative position relationship between the lid part CV and the housing part R is changed from the first position relationship to the second position relationship in the state in which the fastening member SC is not detached from the housing part R, but loosened. Accordingly, the width of the third hole CO13 is larger than the diameter of the axis portion SX. The axis portion SX refers to a part in which a thread is formed of the parts of the fastening member SC. The cutout portion CO1 has the third hole CO13, and thus, the user may rotate the lid part CV by the predetermined angle about the predetermined axis. As a result, the user may detach the lid part CV from the housing part R without detaching the fastening member SC from the housing part R in the state in which the fastening member SC is loosened.

Figure 6:
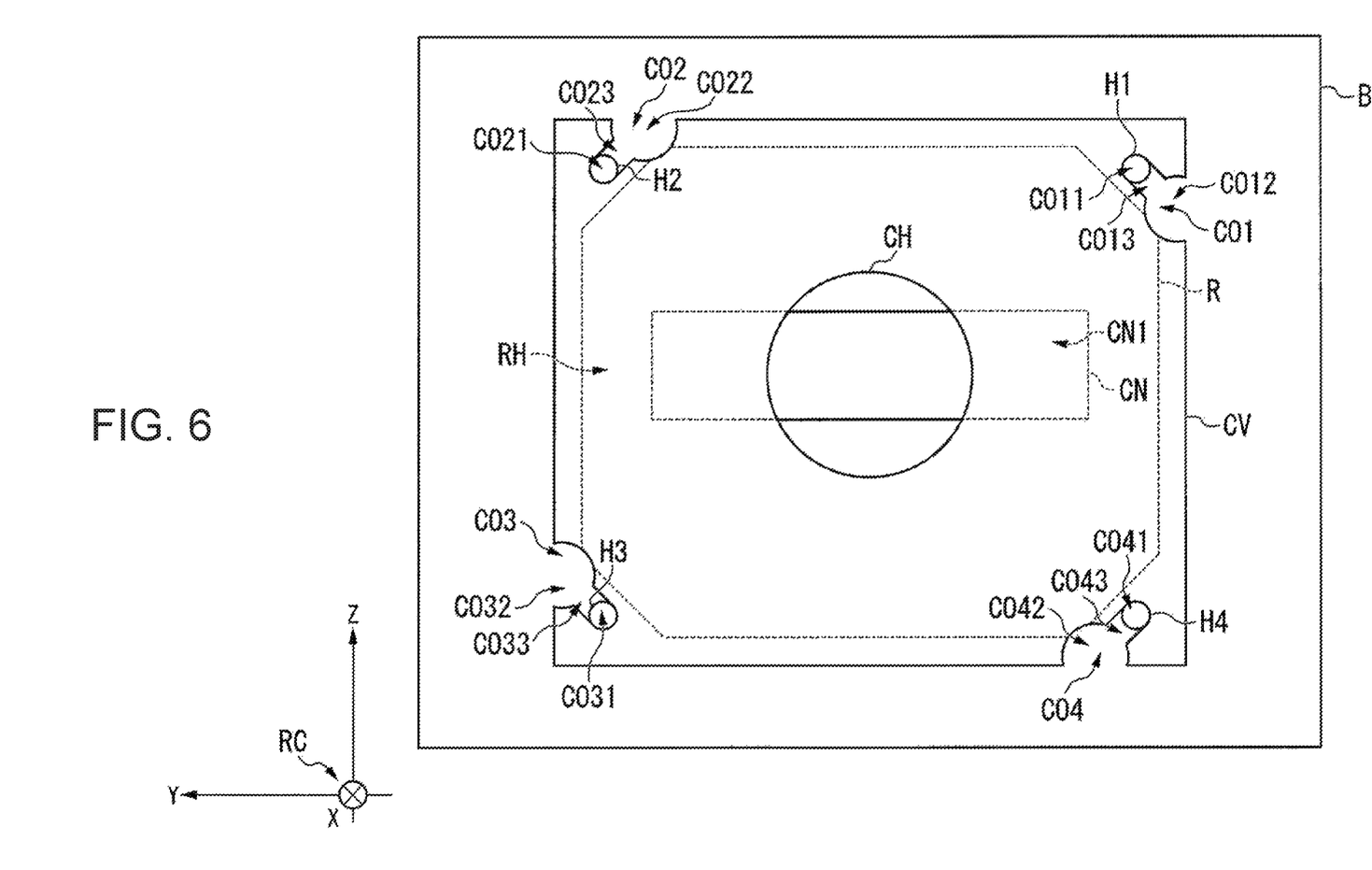
FIG. 6 shows an example of a state in which a fastening member SC is detached from the lid part CV and the housing part R in the base B shown in FIG. 4.

FIG. 6 shows an example of a state in which the fastening member SC is detached from the lid part CV and the housing part R in the base B shown in FIG. 4. As shown in FIG. 6, when the base B is seen toward the positive direction of the X-axis in the robot coordinate system RC, the first hole CO11 of the cutout portion CO1 and the screw hole H1 overlap in the state.

Figure 7:
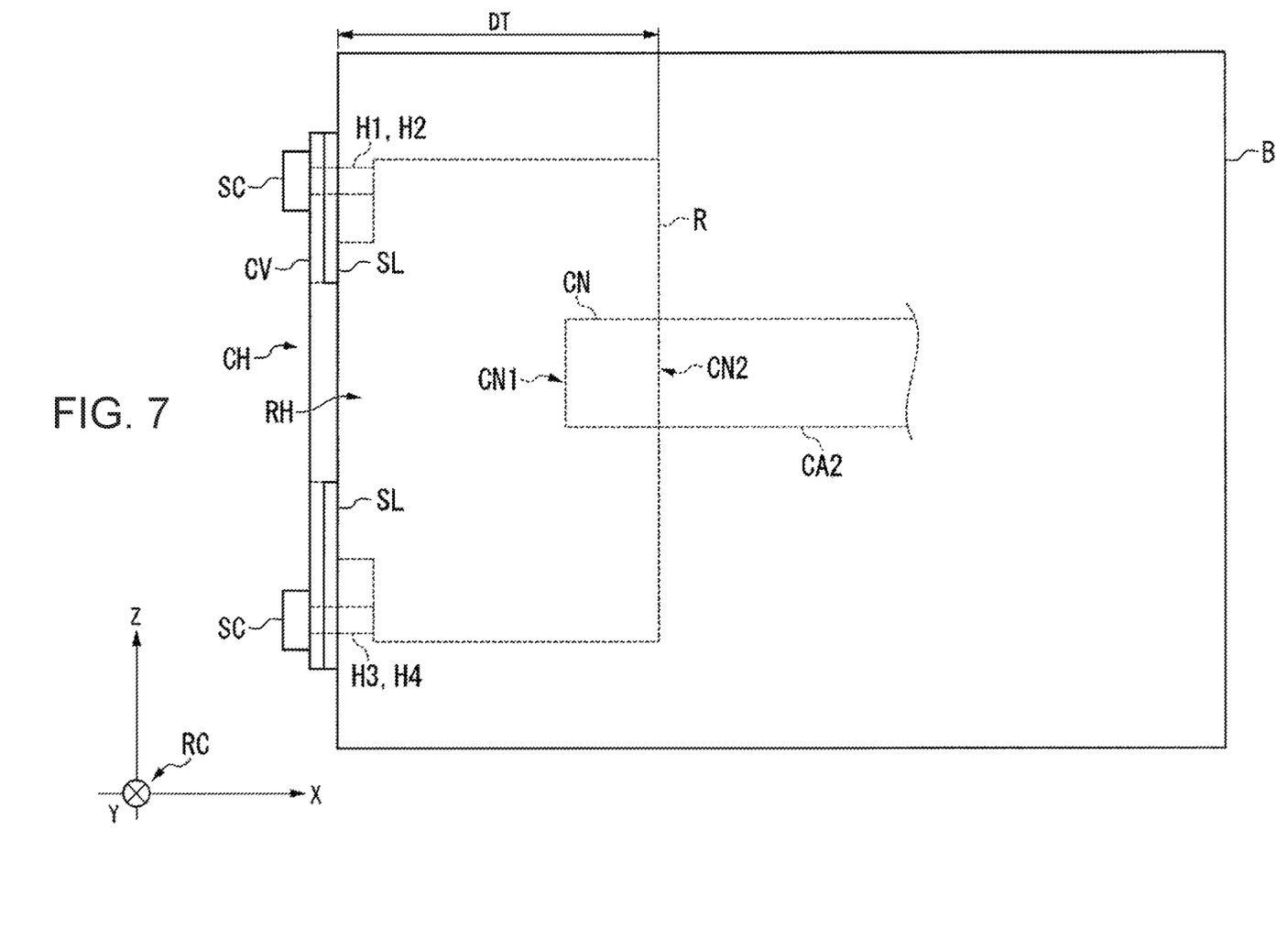
FIG. 7 is a side view of the base B shown in FIG. 4 as seen toward the positive direction of the Y-axis in the robot coordinate system RC.

FIG. 7 is a side view of the base B shown in FIG. 4 as seen toward the positive direction of the Y-axis in the robot coordinate system RC. Note that, in FIG. 7, the respective cutout portions CO1 to CO4 of the lid part CV are omitted to avoid complication of the drawings. It is desirable that a depth DT of the housing part R shown in FIG. 7 is from about 20 to 40 millimeters, e.g. about 30 millimeters. This is because, if the depth DT is too deep, the user's hand does not reach the depth of the housing part R and, if the depth DT is too shallow, the connecting portion CN interferes with the back surface of the base B and the lid part CV. Here, the depth DT shown in FIG. 7 refers to a length along the X-axis direction in the robot coordinate system RC from the lower surface of the lid part CV to the bottom surface of the housing part R when the lid part CV is fastened to the housing part R. The lower surface of the lid part CV refers to a surface on the housing part R side of the surfaces of the lid part CV in the case. Further, the bottom surface of the housing part R refers to a surface facing the lid part CV of the inner surfaces of the housing part R in the case. Note that the depth DT may be shallower than 20 millimeters unless the connecting portion CN interferes with the back surface of the base B and the lid part CV, and may be deeper than 40 millimeters when the size of the opening portion RH is larger than the user's hand or when the user is allowed to use a tool for connecting the first wire CA1 to the connecting portion CN.

Further, in the example shown in FIG. 7, a sealing member SL is stuck to the surface on the housing part R side of the surfaces of the lid part CV when the lid part CV is fastened to the housing part R. Accordingly, in the example, the sealing member SL exists between the lid part CV and the housing part R. The sealing member SL may be any member as long as the member suppresses entry of foreign matter (e.g. liquids, powder and granular materials, gasses) into the housing part R from between the lid part CV and the housing part R. The material of the sealing member SL is e.g. a resin, however, may be another material instead. Note that the sealing member SL may not necessarily exist between the lid part CV and the housing part R.

Figure 8:
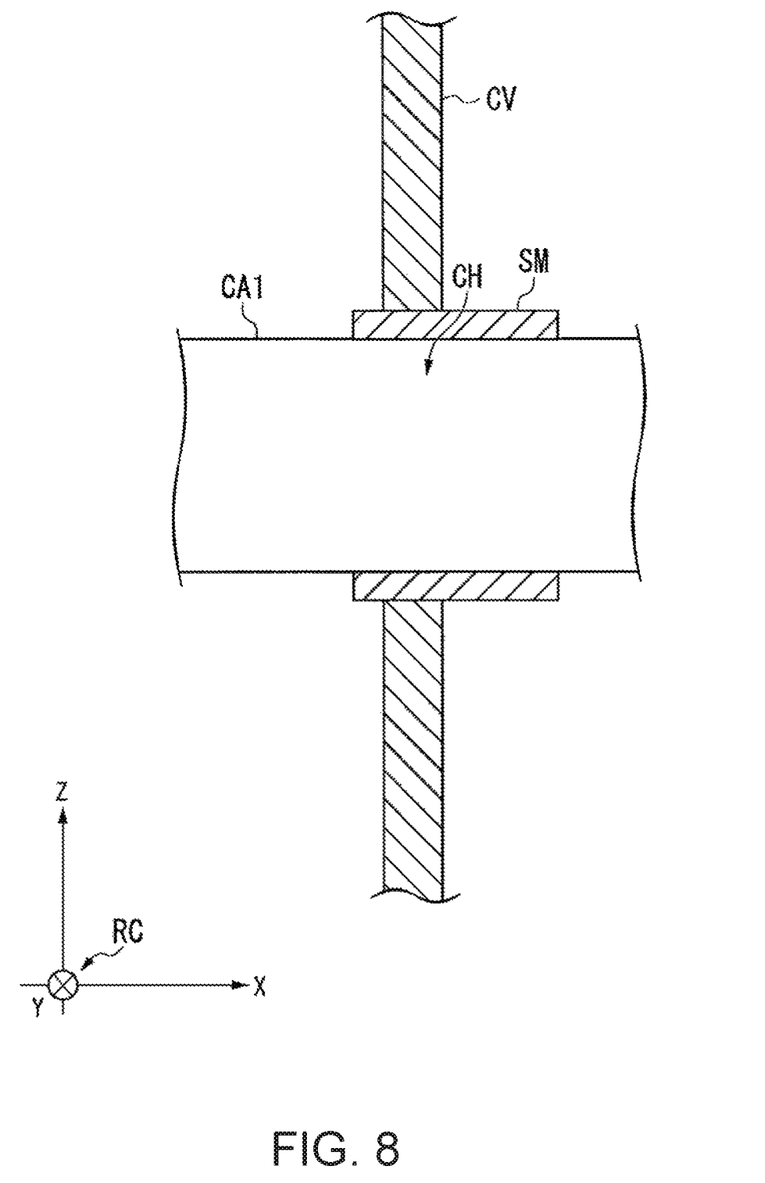
FIG. 8 shows an example of the lid part CV shown in FIG. 4 with a first wire CA1 inserted through the lid part CV.

Next, referring to FIG. 8, the first wire CA1 and the lid part CV will be explained. FIG. 8 shows an example of the lid part CV shown in FIG. 4 with the first wire CA1 inserted through the lid part CV. Further, FIG. 8 is a sectional view of the lid part CV through which the first wire CA1 is inserted cut in a plane passing through the center of an insertion hole CH formed in the lid part CV and parallel to the ZX-plane in the robot coordinate system RC. Note that the section of the first wire CA1 shown in FIG. 8 is shown in white to avoid complication of the drawing. As shown in FIG. 8, the first wire CA1 is inserted through the insertion hole CH formed in the lid part CV. In this regard, as shown in FIG. 8, a sealing member SM is provided between the first wire CA1 and the lid part CV. The sealing member SM may be any member as long as the member suppresses entry of foreign matter (e.g. liquids, powder and granular materials, gasses) into the housing part R from between the first wire CA1 and the lid part CV. The material of the sealing member SM is e.g. a resin, however, may be another material instead. Note that the sealing member SM may not necessarily be provided between the first wire CA1 and the lid part CV. The sealing member SM is an example of a first sealing member.

Figure 9:
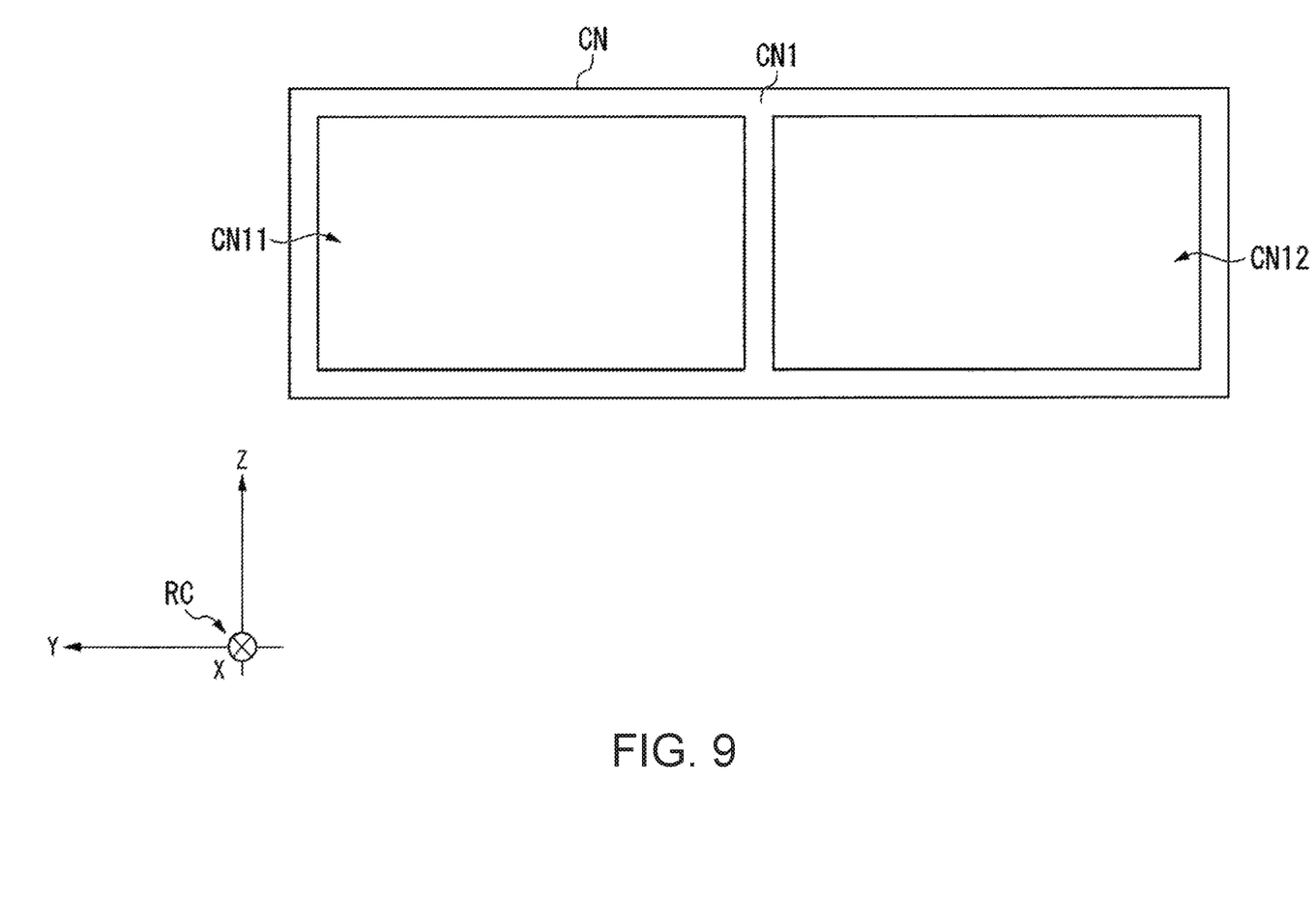
FIG. 9 shows an example of a first part CN1 of a connecting portion CN shown in FIG. 4.

Next, referring to FIG. 9, the first part CN1 of the connecting portion CN will be explained. FIG. 9 shows an example of the first part CN1 of the connecting portion CN shown in FIG. 4. As shown in FIG. 9, a first connecting portion CN11 and a second connecting portion CN12 are provided in the first part CN1. The first connecting portion CN11 is a connector to which the above described power line is connected. The second connecting portion CN12 is a connector to which the above described signal line is connected. Thereby, the robot 20 may suppress defects in a part or all of the first connecting portion CN11, the second connecting portion CN12, and the second wire CA2. The user may suppress erroneous connection of the signal line to the portion to which the power line is connected and erroneous connection of the power line to the portion to which the signal line is connected. Note that, in the first part CN1, only one of the first connecting portion CN11 and the second connecting portion CN12 may be provided, another connector may be provided in place of one or both of the first connecting portion CN11 and the second connecting portion CN12, or another connector may be provided in addition to one or both of the first connecting portion CN11 and the second connecting portion CN12. Or, the first connecting portion CN11 and the second connecting portion CN12 may collectively form a single connector.

As described above, the first part CN1 and the first wire CA1 of the connecting portion CN are housed inside of the housing part R. Accordingly, it is unnecessary to perform processing for suppressing entry of foreign matter such as waterproofing between the first part CN1 and the first wire CA1. As a result, a manufacturer of the robot 20 may manufacture the robot 20 using an inexpensive connector as the connecting portion CN and may manufacture the robot 20 using an inexpensive wire as the first wire CA1. That is, the robot 20 may suppress monetary cost increase related to the manufacture of the robot 20.

The connecting portion CN is fixed to the housing part R, and thus, the connecting portion CN is not taken from inside of the base B to outside of the base B when work of detaching the first wire CA1 from the connecting portion CN is performed. Accordingly, regarding the second wire CA2 connected to the second part CN2 of the connecting portion CN outside of the housing part R inside of the base B, the extra length for the connecting portion CN to be taken from inside of the base B to outside of the base B may be made shorter. As a result, the robot 20 may suppress generation of noise in the second wire CA2.

Returning to FIG. 1, the above described drive unit of the robot 20 drives the movable unit A. The drive unit refers to each of a first drive unit M1, a second drive unit M2, a third drive unit M3, and a fourth drive unit M4. Note that the drive unit may include another drive unit in place of a part or all of these four drive units, or may include another drive unit in addition to all of the four drive units.

The base B includes the first drive unit M1 as the drive unit that rotates the first arm A1 about the first axis AX1. The first drive unit M1 is an actuator controlled by the robot control apparatus 30. That is, the first axis AX1 is an axis that coincides with the rotation shaft of the first drive unit M1.

The first arm A1 rotates about the first axis AX1 and moves in horizontal directions with the rotation of the rotation shaft of the first drive unit M1. The horizontal directions are directions orthogonal to the upward and downward directions in the example. The horizontal directions are e.g. directions along the XY-plane in the world coordinate system or directions along the XY-plane in the robot coordinate system RC of the robot 20.

The second arm A2 rotates about the second axis AX2 and moves in the horizontal directions. The second arm A2 includes the second drive unit M2 as the drive unit that rotates the second arm A2 about the second axis AX2 with respect to the first arm A1. The second drive unit M2 is an actuator controlled by the robot control apparatus 30. That is, the second axis AX2 is an axis that coincides with the rotation shaft of the second drive unit M2.

Further, the second arm A2 includes the third drive unit M3 as a vertical actuator and the fourth drive unit M4 as a rotation actuator and supports the shaft S. The third drive unit M3 turns the ball screw nut provided in the outer circumference part of the ball screw groove of the shaft S with a timing belt (not shown) or the like, and thereby, moves the shaft S in the upward and downward directions. The fourth drive unit M4 turns the ball spline nut provided in the outer circumference part of the spline groove of the shaft S with a timing belt (not shown) or the like, and thereby, rotates the shaft S about the center axis of the shaft S.

The respective first drive unit M1 to fourth drive unit M4 as the four drive units of the robot 20 are communicably connected to the robot control apparatus 30 by the first wire CA1. The first wire CA1 includes power lines for supplying electric power from the robot control apparatus 30 to the respective four drive units and signal lines for transmitting signals between the robot control apparatus 30 and the respective four drive units. Thereby, the respective four drive units perform operation based on control signals acquired from the robot control apparatus 30. Note that the wired communications via the signal lines are performed according to standards of e.g. Ethernet (registered trademark), USB (Universal Serial Bus), or the like. Or, part of the four drive units may be adapted to be connected to the robot control apparatus 30 via wireless communications performed according to communication standards of Wi-Fi (registered trademark) or the like. Or, the first wire CA1 may include another wire in addition to the power lines and the signal lines.

The robot control apparatus 30 transmits the control signals to the robot 20 to operate the robot 20. Thereby, the robot control apparatus 30 may allow the robot to perform predetermined work. The robot control apparatus 30 is separately provided from the robot 20 and placed outside of the robot 20.

Note that the first wire CA1 connected to the connecting portion CN may be a wire connected from another apparatus than the robot control apparatus 30 to the robot 20 in place of the wire connected from the robot control apparatus 30 to the robot 20. For example, the other apparatus is a teaching pendant, notebook PC (Personal Computer), or the like connected to the robot 20.

In FIGS. 1 and 8, the first wire CA1 including the power lines and the signal lines is drawn as an integrated single wire, however, this is only an example. The first wire CA1 may be formed by two or more wires. In this case, for example, the power lines are collected as a single wire and the signal lines are collected as a single wire. Further, in the case, the insertion hole CH through which the first wire CA1 formed by two or more wires is inserted may have a configuration with insertion holes corresponding to the respective two or more wires or a configuration through which all of the two or more wires are inserted.

The respective cutout portions CO1 to CO4 of the lid part CV may be formed in the lid part CV by e.g. cutting out through holes for screws to which the ground of the first wire CA1 is fixed.

Or, the lid part CV does not necessarily include a part or all of the cutout portions CO1 to CO4. When the lid part CV does not include all of the cutout portions CO1 to CO4, screw holes through which the fastening members SC as screws are inserted are formed in the lid part CV. Then, the lid part CV is fastened to the housing part R by the fastening members SC. Note that, in the case, the lid part CV may be fixed to the housing part R using another member than the fastening members SC.

The first wire CA1 is connected to the first part CN1 of the connecting portion CN using e.g. a one-touch panel-mounted connector. In this case, the user may easily detach the first wire CA1 from the connecting portion CN with a hand. Note that the first wire CA1 may be connected to the connecting portion CN by another connector.

As described above, the robot 20 in the embodiment includes a base (the base B in the example), a movable unit (the movable unit A in the example) provided on the base, a drive unit (the first drive unit M1 to fourth drive unit M4 in the example) that drives the movable unit, a connecting portion (the connecting portion CN) to which at least a part of a first wire (the first wire CA1 in the example) of another apparatus (the robot control apparatus 30 in the example) is connected, and a second wire (the second wire CA2 in the example) that connects the drive unit and the connecting portion, and the base has a housing part (the housing part R in the example) having an opening portion (the opening portion RH in the example), to which the connecting portion is fixed and a lid part (the lid part CV in the example) covering at least a part of the opening portion, through which the first wire is inserted. Thereby, the robot 20 may suppress a defect in at least one of the connecting portion and the second wire.

Further, in the robot 20, the lid part has a cutout portion (the the cutout portions CO1 to CO4 in the example) with which the lid part can be detached from the housing part in the state in which a fastening member for fastening the lid part and the housing part is loosened. Thereby, the robot 20 may shorten the time required for work of detaching the lid part from the housing part.

The robot 20 has a first sealing member (the sealing member SM in the example) between the first wire and the lid part. Thereby, the robot 20 may suppress entry of foreign matter from between the first wire and the lid part.

In the robot 20, the other apparatus is a robot control apparatus (the robot control apparatus 30 in the example) that controls the robot 20. Thereby, the robot 20 may suppress a defect in at least one of the connecting portion and the second wire to which at least a part of the first wire of the robot control apparatus is connected via the connecting portion.

In the robot 20, the first wire includes a power line for supplying electric power from the robot control apparatus to the drive unit and a signal line for transmitting signals between the robot control apparatus and the drive unit. Thereby, the robot 20 may suppress a defect in at least one of the connecting portion and the second wire to which at least a part of the first wire including the power line and the signal line is connected.

In the robot 20, the connecting portion has a first connecting portion (the first connecting portion CN11 in the example) to which the power line is connected and a second connecting portion (the second connecting portion CN12 in the example) to which the signal line is connected. Thereby, the robot 20 may suppress a defect in a part or all of the connecting portion having the first connecting portion and the second connecting portion and the second wire.

As above, the embodiments of the invention are described with reference to the drawings, however, the specific configurations are not limited to the embodiments and changes, replacements, deletions, etc. may be made without departing from the scope of the invention.

The entire disclosure of Japanese Patent Application No. 2017-121159, filed Jun. 21, 2017 is expressly incorporated by reference herein.

What is claimed is:

1. A robot comprising:
   a base;
   an arm provided on the base;
   an actuator that drives the arm;
   a connector to which at least a part of a first wire of another apparatus is connected; and
   a second wire that connects the actuator and the connector,
   wherein the base has
   a housing having an hole, to which the connector is fixed, and
   a lid covering at least a part of the hole, through which the first wire is inserted.

2. The robot according to claim 1, wherein the lid has a cutout with which the lid can be detached from the housing in a state in which a screw for fastening the lid and the housing is loosened.

3. The robot according to claim 1, wherein a first seal is provided between the first wire and the lid.

4. The robot according to claim 1, wherein the other apparatus is a robot control apparatus that controls the robot.

5. The robot according to claim 2, wherein the other apparatus is a robot control apparatus that controls the robot.

6. The robot according to claim 4, wherein the first wire includes a power line for supplying electric power from the robot control apparatus to the actuator and a signal line for transmitting signals between the robot control apparatus and the actuator.

7. The robot according to claim 5, wherein the first wire includes a power line for supplying electric power from the robot control apparatus to the actuator and a signal line for transmitting signals between the robot control apparatus and the actuator.

8. The robot according to claim 6, wherein the connector has a first connector to which the power line is connected and a second connector to which the signal line is connected.

9. The robot according to claim 7, wherein the connector has a first connector to which the power line is connected and a second connector to which the signal line is connected.

10. A robot system comprising:
    the robot that includes a base, an arm provided on the base, an actuator that drives the arm, a connector to which at least a part of a first wire of another apparatus is connected, and a second wire that connects the actuator and the connector; and
    a robot control apparatus that controls the robot,
    wherein the base has
    a housing having an hole, to which the connector is fixed, and
    a lid covering at least a part of the hole, through which the first wire is inserted.

11. The robot system according to claim 10, wherein the lid has a cutout with which the lid can be detached from the housing in a state in which a screw for fastening the lid and the housing is loosened.

12. The robot system according to claim 10, wherein a first seal is provided between the first wire and the lid.

13. The robot system according to claim 10, wherein the other apparatus is a robot control apparatus that controls the robot.

14. The robot system according to claim 11, wherein the other apparatus is a robot control apparatus that controls the robot.

15. The robot system according to claim 13, wherein the first wire includes a power line for supplying electric power from the robot control apparatus to the actuator and a signal line for transmitting signals between the robot control apparatus and the actuator.

16. The robot system according to claim 14, wherein the first wire includes a power line for supplying electric power from the robot control apparatus to the actuator and a signal line for transmitting signals between the robot control apparatus and the actuator.

17. The robot system according to claim 15, wherein the connector has a first connector to which the power line is connected and a second connector to which the signal line is connected.

18. The robot system according to claim 16, wherein the connector has a first connector to which the power line is connected and a second connector to which the signal line is connected.

* * * * *